(12) United States Patent  
Gehr

(10) Patent No.: US 9,416,253 B2
(45) Date of Patent: Aug. 16, 2016

(54) PARTICLES CONTAINING CARBON FIBRES, USE AND PRODUCTION THEREOF

(71) Applicant: ELG Carbon Fibre International GmbH, Duisburg (DE)

(72) Inventor: Marco Gehr, Lindlar (DE)

(73) Assignee: ELG CARBON FIBRE INTERNATIONAL GMBH, Duisburg (DE)

( * ) Notice: Subject to any disclaimer, the term of this patent is extended or adjusted under 35 U.S.C. 154(b) by 0 days.

(21) Appl. No.: 14/769,117

(22) PCT Filed: Feb. 14, 2014

(86) PCT No.: PCT/EP2014/052890
§ 371 (c)(1),
(2) Date: Aug. 20, 2015

(87) PCT Pub. No.: WO2014/128055
PCT Pub. Date: Aug. 28, 2014

(65) Prior Publication Data
US 2015/0376376 A1    Dec. 31, 2015

(30) Foreign Application Priority Data

Feb. 20, 2013  (EP) .................... 13000863
Mar. 11, 2013  (EP) .................... 13001218
Aug. 12, 2013  (EP) .................... 13180027

(51) Int. Cl.
| | |
|---|---|
| C08K 7/06 | (2006.01) |
| C08K 7/24 | (2006.01) |
| C08K 9/06 | (2006.01) |
| B29C 35/02 | (2006.01) |
| C08J 3/12 | (2006.01) |
| C08K 9/00 | (2006.01) |
| C08K 9/08 | (2006.01) |
| B29L 31/00 | (2006.01) |

(52) U.S. Cl.
CPC . *C08K 7/06* (2013.01); *B29C 35/02* (2013.01); *C08J 3/12* (2013.01); *C08K 7/24* (2013.01); *C08K 9/06* (2013.01); *B29L 2031/772* (2013.01); *C08J 2383/04* (2013.01); *C08K 9/00* (2013.01); *C08K 9/08* (2013.01)

(58) Field of Classification Search
CPC .............. C08K 7/06; C08K 7/24; C08K 9/00; C08K 9/06; C08K 9/08; B29C 35/02; B29L 2031/772; C08J 3/12; C08J 2383/04; Y10T 428/2892
USPC ......................................... 428/402
See application file for complete search history.

(56) References Cited

U.S. PATENT DOCUMENTS

2010/0189629 A1*  7/2010  Price ................ B29B 17/02
                                                  423/461
2012/0077402 A1*  3/2012  Grasser ............. B29B 15/10
                                                  442/179

FOREIGN PATENT DOCUMENTS

DE    102005044395   *  3/2006
WO    WO2011/070026  *  6/2011

* cited by examiner

*Primary Examiner* — Leszek Kiliman
(74) *Attorney, Agent, or Firm* — Edward E. Sowers; Brannon Sowers & Cracraft PC

(57) ABSTRACT

The present invention relates to carbon fiber-containing particles, preferably in the form of pellets or granules, which are suitable, in particular, for producing carbon fiber-containing (composite) materials, preferably carbon fiber-containing plastics, and also a process for producing them and their use.

18 Claims, 1 Drawing Sheet

PARTICLES CONTAINING CARBON FIBRES, USE AND PRODUCTION THEREOF

CROSS-REFERENCES TO RELATED APPLICATIONS

This application is a National Stage filing of International Application PCT/EP 2014/052890, filed Feb. 14, 2014, entitled "PARTICLES CONTAINING CARBON FIBRES, USE AND PRODUCTION THEREOF" and claiming priority to European Applications EP 13 000 863.4 filed Feb. 20, 2013, EP 13 001 218.0 filed Mar. 11, 2013, and EP 13 180 027.8 filed Aug. 12, 2013. The subject application claims priority to PCT/EP 2014/052890, to EP 13 000 863.4, to EP 13 001 218.0, and to EP 13 180 027.8, and incorporates all by reference herein, in their entirety.

BACKGROUND OF THE INVENTION

The present invention relates to the technical field of composites (compounds), in particular composites having carbon fibres as preferably particulate additives.

In particular, the present invention relates to carbon fibre-containing particles, in particular in the form of pellets or granules, which are, in particular, suitable for producing carbon fibre-containing materials, in particular carbon fibre-containing plastics, in particular carbon fibre-containing composites, and a process for producing them and also their use.

Composites (also referred to synonymously as compounds or moulding compositions) are generally preferably homogeneous mixtures of, in particular, a single type of base materials, in particular plastics and plastic mixtures, to which at least one aggregate, e.g. fillers, reinforcing materials or additives, has been added in order to improve the properties of the base material, in particular in respect of improved performance, reduced costs, simplified further processing and more attractive appearance. Thus, for example, the UV stability and the hydrolysis resistance of plastics which are to be used for components in the exterior sector can be improved significantly by addition of stabilizers.

As fillers, use is made of, in particular, particulate materials such as talc, chalk, mica, barium sulphate, carbon black, ceramic powder, metal powder or the like, which are intended to increase the volume of the composites without changing the important properties. An increase in the volume is desirable with a view to, in particular, the storage and transport costs for the composites.

The addition of additives such as antioxidants, lubricants, antistatics, stabilizers, light stabilizers, parting agents, mould release agents, nucleating agents, UV absorbers, flame retardants, fluoropolymers (e.g. PTFE), pigments or the like allows the properties of the base material to be set in a manner targeted at the respective application. Additives enable, for example, the colour or the thermal and chemical stability of the composite to be adjusted. Furthermore, the addition of processing aids leads to improved processability of the composites in subsequent processes such as injection moulding or the like.

Changes in the mechanical properties of the base material, in particular impact modification of mechanical parameters such as tensile strength, elongation at break and impact toughness, can be achieved, in particular, by the addition of reinforcing materials. Reinforcing materials used are, in particular, glass fibres, preferably in the form of short and long glass fibres, carbon fibres or wollastonite.

Composites are produced, in particular, by compounding, where compounding corresponds to the treatment of the plastic and describes the upgrading process of plastics by mixing in aggregates (e.g. fillers, reinforcing materials, additives, etc.) to achieve targeted optimization of the properties of the base materials. In general, compounding encompasses various process stages or process operations such as transport, melting, dispersing, mixing, degassing and pressure buildup, and is carried out, in particular, in extruders, for example corotating twin-screw extruders, contrarotating twin-screw extruders, planetary-gear extruders, cokneaders, etc.

To achieve very homogeneous mixing of base materials with aggregates, the aggregates should be able to be incorporated very homogeneously into the base material during compounding. However, most of the abovementioned aggregates have, as a result of their poor wettability, often only unsatisfactory incorporability, so that the result is composites which are not fully homogeneous and, owing to the inhomogeneous distribution of the aggregates, do not have constant properties within the composite and thus only unsatisfactory quality.

Owing to the poor incorporability of the aggregates, demixing of base material and aggregates can also occur, so that production of the composite is not readily possible. This can, in particular, be the case when large amounts of various aggregates are used, in particular when the aggregates have significantly different densities from the base material, in particular the plastic.

Although the poor incorporability of the aggregates can be improved by the use of high shear forces, partial destruction, in particular comminution, of the aggregates can occur here. Particularly when using stiffening materials, comminution leads to significantly poorer mechanical properties of the composite.

Furthermore, the incorporation of aggregates in the compounding operation often leads to an adverse effect on the rheological properties, in particular the flow properties or flow rates. However, a deterioration in the flow properties, in particular in the case of large amounts of aggregates, is disadvantageous for further processing of the composites since high flow rates are required for the subsequent processing of the composites, e.g. in injection-moulding apparatuses or the like.

The aggregates also have poor handlability because of their often dust-like nature. Thus, special extraction and filter units have to be used in the case of dust-like aggregates in order to rule out a hazard to health during the production and use of the aggregates as a result of dust formation and to avoid the risk of dust explosions. Furthermore, owing to the dust-like nature, the meterability of the aggregates is also poorer since metering of an exact amount of aggregate or production of an exact mixture of aggregates is not ensured. However, exact meterability of the aggregates is of great importance for constant quality of the composites.

To achieve better incorporability, handlability and meterability of the aggregates, shaped bodies, in particular agglomerates, pellets, briquettes or the like, are sometimes also produced from the relevant aggregates in the prior art. However, the shaped bodies produced according to the prior art do not give satisfactory results since they often do not enable sufficiently homogeneous incorporation into the base materials, in particular plastics. The incorporation of the shaped bodies known from the prior art into base materials (e.g. plastics) also mostly leads, particularly in the compounding operation, to an adverse effect on the rheological properties, in particular the flow properties, in particular in the case of large amounts of aggregates, so that the result is composites which can be processed further only with difficulty because their low flow rate.

Furthermore, owing to the high proportion of the auxiliaries (e.g. sizes, etc.) used for producing the shaped bodies in the prior art, flaws can occur within the base material matrix, in particular polymer matrix, which can lead to defects within the composite; when using the shaped bodies containing the auxiliaries as per the prior art, incompatibilities with the base material used can also occur, so that the shaped bodies can be used only for very particular base materials and cannot be used universally for a large number of base materials.

The shaped bodies produced from aggregates in the prior art are consequently associated with many disadvantages in relation to their industrial use, so that there is an increased demand for shaped bodies composed of aggregates which have improved incorporability into a variety of base materials, in particular plastics, with the rheological properties of the resulting composite not being significantly impaired.

SUMMARY

It is therefore an object of the present invention to provide aggregates in readily handlable form, preferably in particulate form, in particular in the form of granules or pellets, which are suitable for incorporation into plastics, while at least largely avoiding or else at least reducing the abovementioned disadvantages associated with the prior art.

In particular, it is an object of the present invention to provide aggregates based on carbon fibres in readily handlable form, preferably in particulate form, in particular in the form of pellets or granules, with good handability being ensured. Furthermore, good incorporability of the aggregates into plastics should be ensured, with, in particular, good compatibility with the base materials, in particular plastics, combined with a very small influence on the rheological properties being sought.

The applicant has now surprisingly found that the above-mentioned problem can be solved in an efficient way by providing particles, in particular pellets or granules, composed of preferably comminuted carbon fibres and produced using a silane- and/or siloxane-based binder as aggregates. The carbon fibre-containing particles, in particular pellets or granules, of the invention have not only good handlability and meterability because of their ability to flow and their freedom from dust but also ensure homogeneous incorporation of the carbon fibres into a variety of base materials, in particular plastics. Furthermore, surprisingly, no deterioration in the rheological properties, in particular the flow properties, is observed when the carbon fibre-containing particles, in particular pellets or granules, of the invention are incorporated into the base materials, in particular plastics, so that the resulting composites can be processed further without problems, in particular by means of injection moulding or the like.

To solve the problem indicated above, the present invention thus proposes carbon fibre-containing particles as described herein. Further, advantageous properties of the carbon fibre-containing particles of the invention are similarly described.

The present invention further provides a process for producing the carbon fibre-containing particles of the invention, as described or defined in the corresponding claims directed to the process for producing the carbon fibre-containing particles itself.

Finally, the present invention further provides for the use of the carbon fibre-containing particles of the invention, as described or defined herein.

It goes without saying that particular variants and embodiments described only in connection with one aspect of the invention also apply analogously to the other aspects of the invention without this being expressly stated.

Furthermore, a person skilled in the art can, for the purposes of the application or for the individual case, deviate from the numbers, values or ranges indicated below without going outside the scope of the present invention.

DETAILED DESCRIPTION OF THE INVENTION

Figure 1:
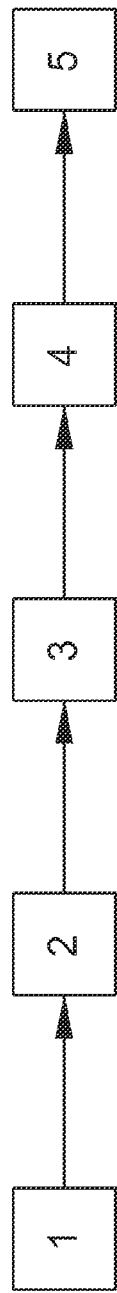
FIG. 1 schematically shows a flow diagram of the process of the invention for producing the carbon fibre-containing particles as per a preferred embodiment of the process of the invention.

According to a first aspect of the present invention, the present invention thus provides carbon fibre-containing particles, preferably in the form of granules or pellets, which are suitable, in particular, for producing carbon fibre-containing materials, preferably carbon fibre-containing plastics, wherein the carbon fibre-containing particles contain carbon fibres, in particular in comminuted form, and
at least one silane- and/or siloxane-based binder.

According to this aspect of the invention, the present invention provides in other words carbon fibre-containing particles, preferably in the form of granules or pellets, which are suitable, in particular, for producing carbon fibre-containing materials, preferably carbon fibre-containing plastics, wherein the carbon fibre-containing particles contain carbon fibres, in particular in comminuted form, together with at least one silane- and/or siloxane-based binder.

The term particle as used in the context of the present invention refers, in particular, to discrete or delineable objects or shaped bodies which consist of a plurality of joined, preferably similar or identical constituents (here specifically: in particular comminuted carbon fibres) and, in particular, can have a dimension in the range from fractions of millimeters through to a few millimeters or even centimeters in all spatial directions. In particular, the particles consist, for the purposes of the present invention, of a plurality of preferably comminuted carbon fibres which are joined to one another to form the respective particles. However, it is not impossible for the purposes of the present invention that the discrete particles are also joined (loosely) to one another, in particular agglomerated.

Furthermore, the term granules as used in the context of the present invention refers, in particular, to particles as described above of undefined shape or geometry which consist of solid constituents (here composed of preferably comminuted carbon fibres), with each particle containing carbon fibres joined to one another or crosslinked with one another. In particular, each granule has sufficient strength to ensure various types of handling and use. Granules are produced by granulation processes known per se, with various processes such as, in particular, fluidized-bed granulation, drum granulation or the like being able to be used.

The term pellets as used in the context of the present invention refers, in particular, to particles composed of compacted constituents joined to one another (here preferably composed of comminuted carbon fibres) having a defined shape or geometry, in particular a particulate, spherical or cylindrical shape. In general, the term is used in the plural since pellets are not used individually but in relatively large amounts. Pellets are produced by processes known per se in process technology for agglomeration, also referred to as pelletization or pelleting processes.

Finally, the term silane- and/or siloxane-based binder as used in the context of the present invention refers to a binder which contains or consists of at least one silane and/or at least one siloxane. Such a product per se is adequately known to those skilled in the art and is commercially available, but has hitherto not yet been taken into consideration for the application according to the invention.

The term silanes as used in the context of the present invention refers, as is known, particularly to compounds which in the case of monomeric silanes have an at least tetravalent silicon atom and in the case of oligomeric or polymeric silanes have a basic framework based on silicon atoms (—Si—Si—). Here, the free valencies of the silicon atom or atoms are each substituted by organic radicals. Thus, the silane-based binder used according to the invention or the silane used according to the invention can also be referred to synonymously as organosilicon compound or as (organo) silane derivative or as organosilane or as organically substituted silane. The (organo)silanes used according to the invention can in principle be selected from among monomeric, oligomeric or polymeric (organo)silanes and mixtures thereof. In the case of monomeric silanes, all four hydrogen atoms of the parent silane (i.e. $SiH_4$) are, as is known, replaced by organic radicals, while in the case of oligomeric or polymeric silanes, an oligomeric or polymeric (Si—Si) basic framework in which the free valencies of the silicon atoms are each substituted by organic radicals is present, as is known.

The term siloxanes as used in the context of the present invention refers, as is known, particularly to compounds which comprise at least one (Si—O—Si) basic framework. Here, the free valencies of the silicon atoms are each substituted by organic radicals. Thus, the siloxane-based binder used according to the invention or the siloxane used according to the invention can also be referred to synonymously as (organo)siloxane derivative or as organosiloxane or as organically substituted siloxane. The (organo)siloxanes used according to the invention can in principle be selected from among monomeric, oligomeric or polymeric (organo)siloxanes and mixtures thereof. In the case of polymeric (organo) siloxanes, the term polysiloxanes or silicones is used synonymously. In particular, such polysiloxanes have a basic framework of the —$(SiR_2—O)_n$— or $R_3Si—(O—SiR_2)_m$—O—$SiR_3$ type, where the radicals or substituents R are identical or different and are each, independently of one another, an organic radical and the variables n and m are integers greater than 1 or greater than or equal to 1.

In particular, the silane- and/or siloxane-based binder used according to the invention can contain at least one organosilane selected from among monomeric, oligomeric and polymeric organosilanes and/or at least one organosiloxane selected from among monomeric, oligomeric and polymeric organosiloxanes (e.g. together with at least one solvent or dispersant and/or at least one additive) or consist thereof.

A particular aspect of the carbon fibre-containing particles, in particular in the form of pellets or granules, of the invention is that, in particular, stable particles which comprise preferably comminuted carbon fibres but surprisingly can readily be incorporated as aggregates or additives into plastics (in particular by means of compounding) can be produced in the context of the invention using a silane- and/or siloxane-based binder, with, in particular, the particles of the invention at least substantially not impairing, in particular, the rheological properties of a polymer matrix when incorporated into such a matrix, so that the resulting material can be processed further without process engineering problems (e.g. by means of injection moulding or the like). Thus, the particles of the invention surprisingly allow both homogeneous incorporation into a polymer matrix, which, without wishing to be tied to a particular theory, can apparently be attributed to the silane- and/or siloxane-based binder ensuring a stable agglomerate of the individual, preferably comminuted carbon fibres in the particulate state, in particular in the pellet or granule state, and direct dissolution of this agglomerate again in a flowable or hot polymer matrix. In other words, extremely homogeneous incorporation of the carbon fibre-containing particles is achieved by the silane- and/or siloxane-based binder firstly allowing good separation or liberation of the carbon fibres from the particles, in particular the pellets or granules, and, secondly, efficient interaction both with the carbon fibres and with the polymer matrix being achieved, so that stable and homogeneous incorporation of the carbon fibres into the polymer matrix is ensured. This distinguishes the silane- and/or siloxane-based binder used according to the invention from other possible binders, in particular those based on polymeric organic resins (e.g. polyurethane, epoxide and polyacrylate resins, etc.), since the latter binders, as studies by the applicant have surprisingly shown, do not allow satisfactorily homogeneous incorporation into a polymer matrix and also lead to a significant deterioration in the rheological properties, in particular the flowability, of the polymer matrix during incorporation thereof.

According to the present invention, the carbon fibre-containing particles can be made at least essentially dust-free, preferably (completely) dust-free. The carbon fibre-containing particles of the invention therefore display significantly improved handling during production and use compared to carbon fibres in binder-free form. In particular, a hazard to health due to dust formation in production and processing is also avoided in an efficient way. Furthermore, the risk of dust explosions is avoided when using the carbon fibre-containing particles of the invention; complicated filter units as are indispensible when using pulverulent aggregates which tend to form dust are not required when using the particles of the invention. In addition, the freedom from dust also achieves improved meterability and incorporation efficiency when using the carbon fibre-containing particles of the invention since no residues at all remain in packaging or machine parts and escape of the aggregates in the form of dust during metering is avoided in the compounding operation.

According to the invention, the carbon fibres within the particles can have an isotropic and/or multidirectional and/or random orientation. The term "isotropic" as used in the context of the present invention refers to the independence of a property (here the strength or stiffness of the carbon fibres) on a particular direction. The term "multidirectional" refers to orientation in all spatial directions, while the term "random orientation" refers to random or statistical orientation, i.e. not determined from outside. Thus, the carbon fibres within an individual particle have many different (spatial) orientations and are not all arranged in a single orientation. The isotropic orientation of the carbon fibres within the individual particles also allows subsequent isotropic and/or multidirectional distribution of the carbon fibres within the composite, in particular the plastic, in which the carbon fibres are ultimately to be incorporated. Consequently, when the carbon fibre-containing particles, in particular pellets or granules, of the invention are used, it is possible to obtain composites which display an improvement in the mechanical properties, in particular the stiffness and the tensile strength, in all directions. However, the carbon fibres can also be oriented monodirectionally before or during incorporation into the polymer matrix, although such an embodiment is less preferred according to the invention.

According to the invention, the carbon fibres can preferably be present as recycled carbon fibres. In this context, it is possible, in particular, for the recycled carbon fibres to be obtained from carbon fibre-reinforced plastic scrap (CFP scrap), in particular pyrolytically and/or by means of pyrolytic decomposition of the polymer matrix of the CFP scrap in a pyrolysis furnace. The pyrolytic decomposition of the polymer matrix is essentially complete, i.e. exclusively carbon fibres without polymer matrix are obtained after recycling. A suitable process for producing recycled carbon fibres is described, for example, in the documents WO 2009/090264 A1, EP 2 152 487 B1 and US 2010/189629 A1 belonging to the same patent family, whose total relevant disclosure or contents is/are hereby incorporated by reference.

The carbon fibre-reinforced plastic scrap (CFP scrap) used for producing the recycled carbon fibres is obtained, in particular, in the production of aircraft parts and parts for wind turbines (e.g. in the form of offcuts). However, it is also possible, for the purposes of the present invention, to use carbon fibre-reinforced plastic parts (CFP parts) which have to be disposed of because of fractures or cracks within the material. CFP-containing materials or CFP-containing plastic scrap based on patterns, production scrap, prototypes, incorrect batches and "end-of-life" components can also be used as starter materials for producing the recycled carbon fibres.

The particles of the invention composed of recycled carbon fibres have the advantage over particles composed of primary carbon fibres (synonymously also referred to as raw carbon fibres or virgin fibres) that the recycled carbon fibres have better wettability and therefore better incorporability into the polymer matrix. Without wishing to be restricted to a particular theory, the better wettability results from the hydrophilic surface properties due to the pyrolysis process and also the rougher surface of the recycled carbon fibres. Furthermore, the production of recycled carbon fibres can, in comparison to the production of primary or raw fibres, be carried out significantly more cheaply because of the substantially lower energy consumption, so that the carbon fibre-containing particles of the invention can be obtained significantly more cheaply and thus more economically than carbon fibre-containing particles made from primary or raw fibres. In addition, the use of carbon fibres recycled from carbon fibre-reinforced plastic scrap (CFP scrap) has the advantage that this scrap does not have to be disposed of in a costly way or deposited in landfills.

However, it is also possible to use carbon fibre-containing particles based on primary or raw fibres for the purposes of the present invention. However, as has surprisingly been established by the applicant in the course of experiments, the recycled fibres give better results in respect of the incorporability and the influencing of the rheological properties, in particular the flow properties, of the polymer matrix owing to their better wettability, compared to primary fibres.

For the purposes of the present invention, the carbon fibre-containing particles can, in particular, be in free-flowing form or in the form of a free-flowing material. The flowability of the carbon fibre-containing particles of the invention ensures good meterability and incorporability, in particular by avoidance of adhesion of the particles to vessel walls or machine parts. This ensures that the carbon fibre-containing particles of the invention can also be used in industrial, continuously operated compounding apparatuses and can be incorporated in a constant fashion and homogeneously into the polymer matrix so as to give composites based on plastics which have a consistent quality.

In general, the bulk density of the particles of the invention, in particular in granule or pellet form, can vary within a wide range. In particular, the carbon fibre-containing particles have a bulk density in the range from 150 to 750 g/l, in particular in the range from 175 to 700 g/l, preferably in the range from 180 to 600 g/l. Nevertheless, it can be necessary for the purposes of the application or the individual case to deviate from the abovementioned values, without going outside the scope of the present invention.

As regards the determination of the bulk density, this can, in particular, be determined in accordance with ASTM B527-93/00 or alternatively in accordance with ISO 697/EN ISO 60 or DIN 53468.

Owing to the relatively high bulk density of the carbon fibre-containing particles of the invention, the outlay for storage and transport, in particular, is significantly reduced since the particles, in particular pellets or granules, of the invention can be transported and stored in substantially larger amounts.

In a preferred embodiment of the present invention, the carbon fibres are present in comminuted form, in particular in chopped and/or milled form. The chopping of the carbon fibres can be carried out in a conventional cutting apparatus known per se to those skilled in the art, with chopping being able to be carried out essentially by means of wet or dry processes. The fibre lengths of the carbon fibres can be set to the appropriate length by means of multiple comminution, in particular multiple chopping. In this context, previously chopped carbon fibres can be used for producing the milled carbon fibres; the milled carbon fibres can be obtained by milling of the chopped carbon fibres, in particular using a hammer mill, impingement plate mill, screen basket mill or the like.

According to the invention, the carbon fibres in the carbon fibre-containing particles of the invention can preferably have an average fibre length in the range from 0.1 to 5000 $\mu m$, in particular from 1 to 4500 $\mu m$, preferably from 10 to 4000 $\mu m$, more preferably from 50 to 3500 $\mu m$, particularly preferably from 75 to 3250 $\mu m$. The fibre length of the carbon fibres in chopped form is usually greater than the fibre length of the carbon fibres in milled form. However, this is self-evident to a person skilled in the art.

As regards the determination of the fibre length and the fibre diameter, this can generally be carried out by means of methods which are well known per se to those skilled in the art. In particular, the fibre length and the fibre diameter can generally be determined using determination methods based on light scattering, in particular X-ray diffraction and/or laser light scattering, or else by optical microscopy, electron microscopy or the like. In addition, the determination of the fibre lengths and fibre diameters in the millimeter range can also be carried out by means of sieve analysis in accordance with DIN 66165. In particular, the sizes indicated above relate to an at least essentially fibrous base structure. Furthermore, reference is made to what is said below in respect of size determination.

In addition, the carbon fibres can, according to the invention, have an average fibre diameter in the range from 0.1 to 100 $\mu m$, in particular from 1 to 50 $\mu m$, preferably from 2 to 25 $\mu m$, more preferably from 3 to 15 $\mu m$, particularly preferably from 4 to 10 $\mu m$. In this context, the chopped and/or milled carbon fibres can have a similar or comparable or identical fibre diameter. The fibre diameter can, in particular, be determined by optical microscopy and/or electron microscopy.

In a preferred embodiment, the carbon fibre-containing particles can comprise the silane- and/or siloxane-based binder in an amount of from 0.1 to 40% by weight, in particular from 0.5 to 30% by weight, preferably from 1 to 20% by weight, particularly preferably from 2 to 15% by weight, very particularly preferably from 3 to 10% by weight, based on the carbon fibre-containing particles. For the purposes of the present invention, a certain minimum amount of silane- and/or siloxane-based binder should therefore be used in order to join or crosslink the individual carbon fibres to form stable pellets or granules; however, the amount of binder should not exceed the abovementioned upper limit in order to allow good incorporation, in particular into plastics.

In addition, the carbon fibre-containing particles can comprise carbon fibres in an amount of from 60 to 99.9% by weight, in particular from 70 to 99.5% by weight, preferably from 80 to 99% by weight, particularly preferably from 85 to 98% by weight, very particularly preferably from 90 to 97% by weight, based on the carbon fibre-containing particles. As indicated above in respect of the silane- and/or siloxane-based binder, the proportion of carbon fibres should, for the purposes of the present invention, also not exceed a particular maximum amount since otherwise stable particles are no longer obtainable because of the high proportion of carbon fibres; on the other hand, a certain minimum amount is necessary in order to achieve a sufficient effect on incorporation, in particular into plastics.

In addition, the carbon fibre-containing particles can have a plurality of carbon fibres, in particular at least 10 carbon fibres, preferably at least 25 carbon fibres, more preferably at least 50 carbon fibres, particularly preferably at least 75 carbon fibres, very particularly preferably at least 100 carbon fibres, per particle.

In this context, the carbon fibre-containing particles can also have a plurality of carbon fibres, in particular from 10 to 1 000 000 carbon fibres, preferably from 25 to 500 000 carbon fibres, more preferably from 50 to 100 000 carbon fibres, particularly preferably from 75 to 50 000 carbon fibres, very particularly preferably from 100 to 10 000 carbon fibres, per particle.

As regards the silane- and/or siloxane-based binder, the silane- and/or siloxane-based binder can, for the purposes of the present invention, hold together and/or join together, in particular crosslink and/or wet, the carbon fibres of an individual particle, preferably in such a way that particles result and/or the carbon fibres are in each case agglomerated and/or joined to form individual particles. The use according to the invention of the silane- and/or siloxane-based binder results in the carbon fibres being joined to one another or crosslinked with one another so as to give stable particles, in particular pellets or granules. However, the silane- and/or siloxane-based binder at the same time allows breaking-up of the pellet or granule form into the individual carbon fibres on addition to a flowable or liquefied plastic, so that homogeneous incorporation is ensured. Dry pressing of the carbon fibres without binder to form individual particles would, apart from insufficient stability of the resulting particles, lead to a significant undesirable shortening of the length or comminution of the carbon fibres and thus to the problems indicated above in respect of the use of high shear forces.

Furthermore, the silane- and/or siloxane-based binder can, in particular, be selected and/or configured in such a way that it is capable of forming physical and/or chemical bonds, in particular chemical bonds, with a polymer matrix.

In this context, the silane- and/or siloxane-based binder (i.e. the silane and/or siloxane of the binder) can have at least one polar and/or hydrophilic group which can be selected, in particular, from among amino groups, alkoxy groups, aryloxy groups, aralkyloxy groups, hydroxyl groups, thiol groups, halogens, carboxylic acid groups, carboxylic ester groups and ammonium groups, in particular amino groups and hydroxyl groups, preferably primary amino groups, secondary amino groups, tertiary amino groups and hydroxyl groups. The polar and/or hydrophilic groups of the silane- and/or siloxane-based binder ensure interaction with the carbon fibres so as to give stable particles, in particular pellets or granules. Furthermore, the interaction of the silane- and/or siloxane-based binder with the polymer matrix of the composite allows homogeneous and stable incorporation of the carbon fibre-containing particles of the invention. In addition, matching of the polar and/or hydrophilic group of the silane- and/or siloxane-based binder to the respective polymer matrix allows targeted setting of the properties of the carbon fibre-containing particles of the invention in relation to the polymer matrix used in the particular case, so that optimal and homogeneous incorporability and distribution of the carbon fibres within the polymer matrix is always ensured. The carbon fibre-containing particles can thus be used universally and independently of the respective polymer matrix.

In a preferred embodiment, the silane- and/or siloxane-based binder can be or contain at least one alkoxysilane, in particular an alkoxysilane containing at least one polar and/or hydrophilic group or an oligomer thereof, where the polar and/or hydrophilic group can be selected, in particular, from among amino groups, alkoxy groups, aryloxy groups, aralkyloxy groups, hydroxyl groups, thiol groups, halogens, carboxylic acid groups, carboxylic ester groups and ammonium groups, in particular amino groups and hydroxyl groups, preferably primary amino groups, secondary amino groups, tertiary amino groups and hydroxyl groups.

Particularly good results are obtained in the context of the present invention when the silane- and/or siloxane-based binder is or contains at least one alkoxysilane, in particular an alkoxysilane containing at least one amino group, preferably an aminoalkylalkoxysilane, or an oligomer thereof.

In addition, the silane- and/or siloxane-based binder can also contain at least one unit derived from 1,2-ethylenediamine.

Furthermore, the silane- and/or siloxane-based binder can contain at least one alkoxy group, in particular a methoxy, ethoxy or propoxy group, preferably on the silicon atom.

According to the invention, preference is given to using low molecular weight or at most oligomeric silanes as binders. In particular, the silane- and/or siloxane-based binder in such a case (i.e. when the silane- and/or siloxane-based binder contains a low molecular weight or at most oligomeric silane or consists thereof) can have a molecular weight in the range from 100 to 10 000 g/mol, in particular from 150 to 7500 g/mol, preferably from 175 to 5000 g/mol, particularly preferably from 200 to 2500 g/mol. It has been found that particularly good results are obtained in the context of the present invention when the molecular weight of the silane- and/or siloxane-based binder in such a case (i.e. when the silane- and/or siloxane-based binder contains a low molecular weight or at most oligomeric silane or consists thereof) is in the abovementioned range. As regards the determination of the molecular weight, reference may be made to methods which are generally known to those skilled in the art, e.g. gel permeation chromatography (GPC), in particular gel permeation chromatography in accordance with DIN 55672, preferably using polystyrene and/or polymethacrylate as internal standard. In the case of polymeric compounds, the abovementioned molecular weights relate to average, in particular weight average molecular weights.

Particularly good results are obtained in the context of the present invention when the silane- and/or siloxane-based binder contains or is at least one compound of the general formula (I)

$$(R^1)(R^2)N-[CH_2]_n-N(R^3)(R^4) \qquad (I)$$

or an oligomer thereof or consists thereof,
where, in the general formula (I), the variable n represents an integer from 1 to 10, preferably 2, and the radicals $R^1$, $R^2$, $R^3$ and $R^4$ are each, independently of one another, hydrogen or an organic radical R, but with the proviso that $R^1$, $R^2$, $R^3$ and $R^4$ are not all simultaneously hydrogen and/or that at least one radical $R^1$, $R^2$, $R^3$ and $R^4$ is not hydrogen,
where the organic radical R corresponds to the general formula $$-X-Si(OR')(OR'')(OR''')$$

where the radical X is a divalent organic radical, in particular an alkylene group, preferably a methylene, ethylene, propylene or butylene group, and the radicals R', R" and R'" are each, independently of one another, an alkyl radical, in particular a methyl, ethyl or propyl radical, preferably a methyl or ethyl radical.

In a further preferred embodiment, the silane- and/or siloxane-based binder contains at least one (organo)siloxane, in particular as described above, preferably at least one poly (organo)siloxane, or consists thereof.

Preference is given to polysiloxanes (i.e. synonymously polyorganosiloxanes), preferably polydimethylsiloxanes, in particular preferably linear reactive and/or modified polysiloxanes or polydimethylsiloxanes, preferably those having functional (e.g. polar and/or hydrophilic) groups, in particular having functional terminal groups, in particular selected from among amino groups, alkoxy groups, aryloxy groups, aralkyloxy groups, acryloxy groups, hydroxyl groups, thiol groups, halogens, carboxylic acid groups, carboxylic ester groups, epoxide groups, carbonyl groups, (poly)ether groups, (poly)ester groups and/or ammonium groups.

Non-limiting examples of (organo)siloxanes which are suitable for the purposes of the invention are, for example, dicarboxyalkylpolydimethylsiloxanes, diepoxy-alkylpolydimethylsiloxanes, dihydroxyalkylpolydimethyl-siloxanes, diacryloxyalkylpolydimethylsiloxanes, linear organofunctional polysiloxanes, polyester-modified (poly)siloxanes, linear organofunctional polysiloxanes having amino groups, aminoalkyl-functionalized polydimethylsiloxanes, etc.

When the silane- and/or siloxane-based binder contains at least one (organo)siloxane, in particular as described above, preferably at least one poly(organo)siloxane, or consists thereof, preference is given to the silane- and/or siloxane-based binder (i.e. the (organo)siloxane, preferably the poly (organo)siloxane) having a molecular weight in the range from 500 to 100 000 g/mol, in particular from 750 to 50 000 g/mol, preferably from 1000 to 25 000 g/mol, particularly preferably from 1250 to 15 000 g/mol. It has been found that particularly good results are obtained in the context of the present invention when the molecular weight of the silane- and/or siloxane-based binder in such a case (i.e. when the silane- and/or siloxane-based binder contains at least one (organo)siloxane, in particular as described above, preferably a poly(organo)siloxane, or consists thereof) is in the abovementioned range. As regards the determination of the molecular weight, reference may be made to methods generally known to those skilled in the art, for example gel permeation chromatography (GPC), in particular gel permeation chromatography in accordance with DIN 55672, preferably using polystyrene and/or polymethacrylate as internal standard. In the case of polymeric compounds, the abovementioned molecular weights are average, in particular weight average, molecular weights.

In this embodiment, preference is given according to the invention to using, in particular, oligomeric or polymeric (organo)siloxanes or copolyesters thereof as binder.

Similarly particularly good results are obtained in the context of the present invention in this embodiment when the silane- and/or siloxane-based binder contains or is or consists of at least one compound of the general formula (II)

$$R^5-(CH_2)_x-[Si(R^6)_2-O]_m-Si(R^7)_2-(CH_2)_y-R^8 \qquad (II)$$

where, in the general formula (II),
the variable m is an integer from 1 to 75, in particular from 5 to 50, preferably from 7 to 45, particularly preferably from 15 to 35,
the variables x and y are each, independently of one another, an integer from 1 to 10, in particular from 1 to 8, preferably from 1 to 7, more preferably from 1 to 4,
the radicals $R^5$ and $R^8$ are each, independently of one another, hydrogen or an organic radical, in particular an aryl radical or an alkyl radical, in particular an alkyl radical having from 1 to 10 carbon atoms, preferably from 1 to 5 carbon atoms,
the radicals $R^6$ and $R^7$ are each, independently of one another, an epoxide group, an amino group, an aryl radical, an alkyl radical or a polyester group,
in particular where the polyester group corresponds to the general formula $$[O-C(O)-(CH_2)_p]_q-OH$$

where the variables p and q are each, independently of one another, an integer from 1 to 50, in particular from 2 to 40.

Particularly good results are also obtained when the silane- and/or siloxane-based binder comprises a combination of at least one silane and at least one siloxane, in particular as defined above.

The use of the silane- and/or siloxane-based binder, in particular of the abovementioned type and/or according to the above specifications and formulae, ensures, firstly, good bonding or crosslinking of the individual carbon fibres to form particles before incorporation into plastics (i.e. in the state of granules or pellets) and secondly good incorporability so as to give a homogeneous distribution of the carbon fibres within the polymer matrix of the composite.

Furthermore, according to the invention, the silane- and/or siloxane-based binder can additionally contain at least one bonding agent, in particular selected from the group consisting of resins and/or waxes. Such a bonding agent, in particular one based on resins and/or waxes, has the additional advantage that the bonding agent simultaneously acts as (internal) sliding aid or lubricant in the production of the carbon fibre-based particles according to the invention, in particular the granules or pellets, except for an improved initial adhesion. The amount of bonding agent used can vary within wide limits; in particular, the amount of bonding agent used can vary in the range from 0.01 to 80% by weight, in particular from 0.1 to 50% by weight, preferably from 1 to 30% by weight, based on the silane- and/or siloxane-based binder.

In addition, the silane- and/or siloxane-based binder can, for the purposes of the present invention, also contain at least one further auxiliary; the auxiliary can, in particular, be selected from the group consisting of solvents, rheology modifiers, antifoams, pH regulators, emulsifiers, wetting agents, fillers and stabilizers. The abovementioned substances serve, in particular, to match the properties of the silane- and/or siloxane-based binder in a targeted manner to the polymer matrix to be used in each case for the composite and also to various uses of the composite.

For the purposes of the invention, preference is given to the carbon fibre-containing particles being present as pellets or as granules. The use of pellets or granules leads to a significant increase in the bulk density compared to the starting material in the form of carbon fibres, so that the outlay for storage and transport decreases significantly. Furthermore, as mentioned above, formation of dust during storage, transport and processing is avoided. As a consequence, the use of complicated and costly filter systems in the production and processing of the particles of the invention, in particular pellets or granules, can be dispensed with. Furthermore, the particles of the invention can, as a consequence of the pellet or granule form and thus as a consequence of the standardized material size, be used in apparatus or transport systems, e.g. transport screws, etc., as are customarily used in the compounding process.

In a first particular embodiment of the present invention, the carbon fibre-containing particles can thus be in the form of granules.

Particularly good results are obtained when the carbon fibre-containing particles in the form of granules having a diameter in the range from 0.1 to 40 mm, in particular from 0.2 to 30 mm, preferably from 0.4 to 20 mm, more preferably from 0.5 to 10 mm, very particularly preferably from 0.75 to 6 mm. The determination of the diameter can, in particular, be carried out using sieve analysis, preferably in accordance with DIN 66165.

In addition, the carbon fibre-containing particles in the form of granules can have a bulk density in the range from 1 to 800 g/l, in particular from 10 to 700 g/l, preferably from 40 to 600 g/l, more preferably from 70 to 500 g/l, particularly preferably from 100 to 400 g/l, very particularly preferably from 175 to 300 g/l. In general, the determination of the bulk density is carried out as stated above.

Furthermore, the carbon fibre-containing particles in the form of granules can, for the purposes of the present invention, contain the carbon fibres in milled form. The milled carbon fibres can, for the purposes of the present invention, be obtained from previously chopped carbon fibres, in which case it is then possible to comminute the previously chopped carbon fibres further by milling, in particular using mills such as hammer mills, impingement plate mills, screen basket mills or the like.

In addition, the carbon fibres of the carbon fibre-containing particles in the form of granules have an average fibre length in the range from 0.1 to 1000 µm, in particular from 1 to 800 µm, preferably from 5 to 500 µm, more preferably from 10 to 400 µm, particularly preferably from 25 to 300 µm, very particularly preferably from 50 to 250 µm, even more preferably from 75 to 150 µm. Reference may be made to what has been said above in respect of determination of the fibre length.

Furthermore, the carbon fibres of the carbon fibre-containing particles in the form of granules can have an average fibre diameter in the range from 0.1 to 100 µm, in particular from 1 to 50 µm, preferably from 2 to 25 µm, more preferably from 3 to 15 µm, particularly preferably from 4 to 10 µm. As regards the determination of the fibre diameter, reference may be made to what has been said above.

In a further, alternative embodiment, the carbon fibre-containing particles can be in the form of pellets, preferably having an at least essentially cylindrical shape. As stated above, the outlay for storage and transport can be reduced and the handlability and meterability can also be improved as a result of pelletization and the associated increase in the bulk density and the avoidance of dust formation.

In this context, the carbon fibre-containing particles in the form of pellets can have a diameter in the range from 0.5 to 50 mm, in particular from 1 to 40 mm, preferably from 2 to 25 mm, more preferably from 3 to 10 mm, particularly preferably from 4 to 8 mm. The determination of the diameter of the carbon fibre-containing particles of the invention in the form of pellets can, in particular, be carried out by means of sieve analysis in accordance with DIN 66165.

In addition, the carbon fibre-containing particles in the form of pellets can have a length in the range from 0.5 to 50 mm, in particular from 1 to 40 mm, preferably from 2 to 25 mm, more preferably from 3 to 10 mm, particularly preferably from 4 to 8 mm. The determination of the length of the pellets can likewise be carried out by means of the above-described sieve analysis.

Furthermore, the carbon fibre-containing particles in the form of pellets can have a bulk density in the range from to 1000 g/l, in particular from 10 to 800 g/l, preferably from 100 to 700 g/l, more preferably from 200 to 600 g/l, particularly preferably from 300 to 500 g/l, very particularly preferably from 350 to 475 g/l. As regards the determination of the bulk density, reference may be made to what has been said above.

Particularly good results are obtained in the context of the present invention when the carbon fibre-containing particles in the form of pellets contain the carbon fibres in chopped form. Chopping of the carbon fibres can be carried out by means of a cutting machine which is customary for this purpose and is known per se to those skilled in the art, in particular by means of wet or dry processes. The desired fibre lengths can be set by multiple chopping.

Furthermore, the carbon fibre-containing particles in the form of pellets can have the carbon fibres with an average fibre length in the range from 0.01 to 100 mm, in particular from 0.1 to 50 mm, preferably from 0.2 to 25 mm, more preferably from 0.5 to 15 mm, particularly preferably from 1 to 10 mm, very particularly preferably from 2 to 5 mm. The determination of the average fibre length can be carried out by means of the above-described method.

In addition, the carbon fibres of the carbon fibre-containing particles in the form of pellets can have an average fibre diameter in the range from 0.1 to 50 mm, preferably from 0.2 to 25 mm, more preferably from 0.5 to 15 mm, particularly preferably from 1 to 10 mm, very particularly preferably from 2 to 5 mm. The determination of the fibre diameter can be carried out by methods as indicated above.

The present invention further provides, according to a second aspect of the present invention, a process for producing the carbon fibre-containing particles of the invention, wherein carbon fibres, in particular in comminuted form, are firstly brought into contact with at least one silane- and/or siloxane-based binder and the carbon fibres which have been brought into contact with the silane- and/or siloxane-based binder are subsequently shaped to form discrete particles.

In a preferred embodiment of the process of the invention, the carbon fibres are used in chopped and/or milled form. Depending on the desired form of the carbon fibres, either granulation or pelletization is carried out. When using carbon fibres in chopped form, preference is given to carrying out a pelletization, while the carbon fibres in milled form are preferably granulated.

In addition, in a preferred embodiment of the process of the invention, the particles are obtained in the form of pellets or granules or the shaping of the discrete particles is carried out by means of pelletization or granulation. As indicated above, the pelletization or granulation results in advantages in respect of storage, handlability and meterability. The process of the invention can be carried out in commercially available pelletizing machines and commercially available granulating drums.

Particularly good results are obtained in the process of the invention when the silane- and/or siloxane-based binder is used in an amount of from 0.1 to 40% by weight, in particular from 0.5 to 30% by weight, preferably from 1 to 20% by weight, particularly preferably from 2 to 15% by weight, very particularly preferably from 3 to 10% by weight, based on the resulting carbon fibre-containing particles.

In addition, the discrete particles can finally be dried and/or cured in the course of the process of the invention. Drying and/or curing ensures removal of any solvents which may be present in the silane- and/or siloxane-based binder and in this way prevents any contamination of the polymer matrix and also conglutination of the particles after production.

For further information on this aspect of the invention, reference may be made to what has been said above in respect of the carbon fibre-containing particles of the invention, which applies analogously to this aspect of the invention.

Finally, the present invention further provides, according to a third aspect of the present invention, for the use of the carbon fibre-containing particles of the invention for, in particular, plastics, building materials or cement-based systems.

In particular, the carbon fibre-containing particles can be used, in the context of the present invention, for producing carbon fibre-containing plastics. For the purposes of the present invention, thermoplastic polymers, thermoplastic polymer mixtures and thermoset polymers can be used for the purposes of the present invention. In particular, the plastic can be selected from the group consisting of polycarbonate resins, polyamide resins, saturated polyester resins, polyurethane resins, polyacetal resins, polysulphone resins, polyether sulphone resins (PES), polyphenylene sulphide resins (PPS), polystyrene resins (PS), polyolefin resins, polyvinyl chloride resins, polyether ether ketone resins (PEEK), polyetherimide resins (PEI), polyarylene oxide resins, polyamidimide resins, polyacrylate resins, polyimide resins and mixtures and combinations thereof.

In this context, the carbon fibre-containing particles of the invention can, in particular, be provided for compounding, in particular for incorporation into plastics. In particular, upgrading of the plastics and/or in particular an improvement in the mechanical properties can be achieved by incorporation of the carbon fibre-containing particles of the invention.

For further information regarding this aspect of the invention, reference may be made to what has been said above in respect of the other two aspects of the invention, which applies analogously to this aspect of the invention.

The carbon fibre-containing particles of the invention, the process of the invention for producing them and their use according to the invention have a series of advantages which distinguish the carbon fibre-containing particles of the invention, the process for producing them and their use from the prior art:

The carbon fibre-containing particles of the invention have excellent handlability since they are at least substantially dust-free and there is thus no need to take any complicated and costly protective precautions in the form of filter systems in the production and use of the particles, in particular pellets or granules, of the invention.

Furthermore, the carbon fibre-containing particles, in particular pellets or granules, of the invention display a high flowability and good powder flow and thus good meterability, which is why they can be used without problems in automated feed and mixing apparatuses of the prior art in the compounding process.

Furthermore, the carbon fibre-containing particles, in particular pellets or granules, of the invention can readily be incorporated into the polymer matrix, so that homogeneous distribution and thus consistent quality of the composite are ensured. A deterioration in the quality as a result of inhomogeneous distribution of the carbon fibres in the polymer matrix is thus effectively avoided.

In addition, it is possible, owing to the multidirectional or isotropic or random orientation of the carbon fibres within the carbon fibre-containing particles, in particular pellets or granules, of the invention, to produce composites having multidirectionally oriented carbon fibres by means of compounding. Constant mechanical properties, in particular in respect of strength and stiffness, in all directions of the resulting composite can thus be obtained.

Furthermore, an increased impact strength can be achieved as a result of the multidirectional orientation of the carbon fibres within the composite since, without being restricted to a particular theory, a skeleton-like structure of the totality of the carbon fibres, which arises as a result of the multidirectional orientation, is able to absorb the impact energy and distribute it over the resulting composite.

The use of a silane- and/or siloxane-based binder for producing the carbon-containing particles, in particular pellets or granules, of the invention gives stable particles as a result of the crosslinking or bonding of the carbon fibres to one another. However, this crosslinking or bonding of the carbon fibres can easily be broken up on incorporation of the particles of the invention into liquefied or flowable plastics, so that homogeneous incorporation of the carbon fibres results when using the particles of the invention. The silane- and/or siloxane-based binder is also universally compatible with plastics and, in particular, does not lead to any adverse effects on the resulting matrix.

In addition, the carbon-containing particles of the invention can be produced extremely inexpensively since recycled carbon fibres are used as starting material. These can, owing to the significantly less energy-intensive recycling, which requires less than one tenth of the energy for producing primary carbon fibres, and also the carbon fibre-reinforced plastic scrap (CFP scrap) which can be obtained at low cost, be produced significantly more cheaply than primary carbon fibres.

Furthermore, the recycling avoids environmental pollution by ever-increasing amounts of carbon fibre-reinforced plastic scrap (CFP scrap) which is obtained, in particular, in the form of reject parts and offcuts in the production of parts composed of carbon fibre-reinforced plastics (CFPs) and in the disposal of carbon fibre-reinforced plastics (CFPs).

Furthermore, it has surprisingly been found that carbon-containing particles based on recycled carbon fibres, in particular carbon fibres recycled by means of pyrolysis (using CFP-containing plastics materials as starting materials), of the invention have even better incorporability into plastics and even better wettability compared to carbon-containing particles according to the invention based on primary carbon fibres; in this respect, reference may be made to what has been said above.

In addition, at least essentially no change in the flow properties of the corresponding plastic occurs when the carbon fibre-containing particles of the invention are incorporated, while a strong adverse effect on the flow properties is obtained in the prior art. Thus, incorporation of the carbon fibre-containing particles, in particular pellets or granules, of the invention has at least essentially no adverse effect on the further processing of the composites, in particular by injection moulding or the like, although this is the case in the prior art.

Finally, incorporation into hydraulic binders such as cement, mixed binders, hydraulic lime (trass), render and masonry binders based on cement/acrylic, gypsum plaster or the like which cure both in air and under water is also possible. The carbon fibre-containing particles of the invention can thus be used for reinforcing many matrices and consequently have universal applicability.

Further advantages, properties, aspects and features of the present invention may be derived from the following description of preferred examples depicted in the drawing. The above-described features and/or features disclosed in the claims and/or in the following description of the figures can also be combined with one another as required, even if this is not expressly described in detail.

Figure 2A:
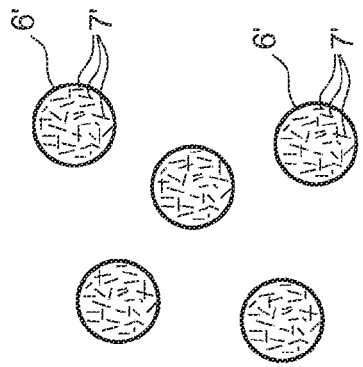
FIG. 2A schematically shows carbon fibre-containing particles of the invention in the form of pellets as per a preferred embodiment of the invention.
Figure 2B:
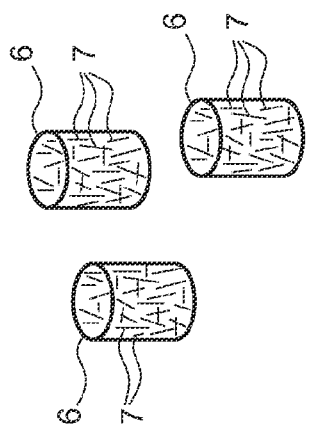
FIG. 2B schematically shows carbon fibre-containing particles of the invention in the form of granules as per a preferred embodiment of the invention.

In the figures,

FIG. 1 schematically shows a flow diagram of the process of the invention for producing the carbon fibre-containing particles as per a preferred embodiment of the process of the invention;

FIG. 2A schematically shows carbon fibre-containing particles of the invention in the form of pellets as per a preferred embodiment of the invention;

FIG. 2B schematically shows carbon fibre-containing particles of the invention in the form of granules as per a preferred embodiment of the invention.

FIG. 1 schematically shows, according to a preferred embodiment of the invention, a flow diagram of the process of the invention for producing carbon fibre-containing particles according to the present invention. In step 1, the carbon fibres used according to the invention are firstly provided, and are subjected to comminution, in particular by means of chopping and/or milling, in a subsequent step 2 before being brought into contact with at least one silane- and/or siloxane-based binder, in particular as defined above, in step 3. The shaping to give pellets or granules, i.e. pelletization or granulation, is subsequently carried out in step 4. This can be finally followed by a drying step 5.

FIG. 2A schematically shows carbon fibre-containing particles of the invention in the form of cylindrical pellets 6, which consist of individual carbon fibres 7 which are joined by means of a silane- and/or siloxane-based binder.

FIG. 2B schematically shows an embodiment in which the carbon fibre-containing particles of the invention are in the form of particulate granules 6' composed of individual carbon fibres 7'.

In the context of the present invention, preferably comminuted individual carbon fibres are thus combined to give carbon fibre-containing particles, in particular in the form of pellets or granules, which in the context of the present invention is carried out using a silane- and/or siloxane-based binder; in this way, it is possible to provide stable particles which are based on carbon fibres and can readily be incorporated as aggregates or additives into plastics of various types, in particular by means of compounding. The particles of the invention completely surprisingly allow homogeneous incorporation into a variety of plastics. In particular, the carbon fibre-containing particles of the invention have the advantage that they do not impair or at least essentially do not impair the rheological properties, in particular the flow properties, of the plastics into which they are incorporated.

Significantly better handling in production and use are achieved as a result of the dust-free and free-flowing nature of the carbon fibre-containing particles of the invention. In particular, both the meterability and the incorporation efficiency are significantly improved in use.

The present invention has thus for the first time made it possible to avoid or at least substantially reduce the disadvantages associated with the incorporation of carbon fibres in the prior art in an efficient way.

Particularly good properties are obtained when recycled carbon fibres are used according to the invention. Such recycled carbon fibres can, for example, be obtained from carbon fibre-reinforced plastics (CFPs), in particular by means of pyrolysis. Such recycled carbon fibres have particularly advantageous behaviour when incorporated into plastics, in particular in respect of homogeneous incorporation and the rheological properties of the resulting composites.

Further embodiments, modifications and variations of the present invention can readily be recognized and realised by a person skilled in the art on reading the description, without the person skilled in the art going outside the scope of the present invention.

The present invention is illustrated with the aid of the following examples which do not, however, restrict the present invention.

EXAMPLES

The particular advantages of the invention are described below for the example of the production and incorporation of carbon fibre pellets and carbon fibre granules into plastics.

1. Production of Carbon Fibre-Containing Pellets and Granules

Starting materials used for the production of carbon fibre-containing pellets and granules are firstly primary carbon fibres without a size (i.e. raw carbon fibres or virgin fibres) and secondly recycled carbon fibres.

Carbon fibres of the type Panex® 35 from Zoltek Companies Inc., St Louis, United States of America, are used as primary carbon fibres.

The recycled carbon fibres are obtained from carbon fibre-reinforced plastic scrap (CFP scrap) as is obtained, for example, in aircraft construction (e.g. aircraft wings/ailerons) or from wind turbines (e.g. wind turbine blades), with recycling being carried out as described in the documents WO 2009/092064 A1, EP 2 152 487 B2 and US 2010/189629 A1 belonging to the same patent family. For this purpose, CFP scrap is subjected to a thermal or pyrolytic treatment in a pyrolysis furnace in which the polymer matrix is removed pyrolytically so as to give pure, i.e. polymer-free, recycled carbon fibres at the end of the process.

The comminution of the carbon fibres is usually carried out by chopping in a cutting apparatus which is customary for this purpose and is known per se to those skilled in the art, with comminution being able in principle to be carried out in a wet or dry process. The desired fibre lengths, which are specified in detail below, are set by multiple comminution, in particular multiple chopping.

Chopping the starting fibres twice is generally sufficient for setting the desired fibre length for the production of pellets, while for the production of granules the previously comminuted, in particular chopped, carbon fibres are additionally subjected to a subsequent milling operation, in particular using mills such as hammer mills, plate impingement mills, screen basket mills or the like, so as to give extremely short fibre lengths as are specified in detail below.

The lengths of the carbon fibres can be set to the desired specification, or "tailored", by means of the above-described comminution operation. However, comminuted recycled carbon fibres having suitable dimensions are also commercially available, for example from ELG Carbon Fibre Limited, Coseley, Great Britain.

The specification of the respective comminuted carbon fibres which are used for producing the carbon fibre-containing particles in the form of pellets and granules in the context of the present invention is indicated in Table 1 below.

TABLE 1

Specifications of the carbon fibres used

| Carbon fibres | Type of comminution | Fibre length | Average fibre diameter |
|---|---|---|---|
| Primary fibres[1] | Chopping | 10-20 mm (nominal) | 7-8 μm |
| Primary fibres[2] | Chopping and milling | 80-120 μm (average) | 7-8 μm |
| Recycled fibres[1] | Chopping | 5-20 mm (nominal) | 7-8 μm |
| Recycled fibres[2] | Chopping and milling | 80-120 μm (average) | 7-8 μm |

[1]Carbon fibres for pellet production;
[2]carbon fibres for granule production.

a) Production of Carbon Fibre-Containing Pellets

The above-specified carbon fibres comminuted by means of chopping are in each case admixed, in particular sprayed, with about 6% by weight, based on the amount of the carbon fibres used, of a binder in a conditioning plant and subsequently processed in a manner known per se to those skilled in the art in a pelletizing machine to give pellets having dimensions of about 5 mm×5 mm (pellet diameter×pellet length). After optional drying at 120° C. for about 1 hour, the carbon fibre-containing pellets are obtained. Alternative binders used are a silane-based binder (according to the invention; alkoxysilane, in particular aminoalkoxysilane, preferably based on a commercially available mixture of aminoalkylmethoxysilane, N,N-bis(3-(trimethylsiloxy)propyl)-1,2-ethanediamine and N,N'-bis(3-(trimethylsiloxy)propyl)-1,2-ethanediamine, e.g. Xiameter® from Dow Corning), a siloxane-based binder (according to the invention; polysiloxane, in particular based on a commercially available polyester-modified polysiloxane or aminoalkyl-functionalized polydimethylsiloxane, e.g. Tegomer® from Evonik Industries AG), and a silane- and siloxane-based binder (according to the invention; mixture of abovementioned alkoxysilane and abovementioned polysiloxane), partly together or in admixture with a wax-based bonding agent, and also binders based on polymeric organic resins (not according to the invention; epoxy resin, polyurethane resin, polyacrylate resin).

Pellets having the following specification as per Table 2 below are obtained in each case.

TABLE 2

Properties of the carbon fibre-containing pellets

| | |
|---|---|
| Diameter of pellets | 5 mm |
| Average length of pellets | 5 mm |
| Average fibre diameter of the carbon fibres | 7-8 μm |
| Nominal fibre length of the carbon fibres | 3-8 mm |
| Bulk density of the pellets | 400-450 g/l |
| Amount of binder in the pellets | approx. 6% by weight | b) Production of Carbon Fibre-Containing Granules

The above-specified carbon fibres comminuted by means of chopping and milling are in each case admixed, in particular sprayed, with about 6% by weight, based on the amount of the carbon fibres used, of a binder in an agitated granulating drum and subsequently processed in a manner known per se to those skilled in the art in a granulating machine to give granules having diameters of from about 1 to 8 mm. After optional drying at 120° C. for about 1 hour, the carbon fibre-containing granules are obtained. Alternative binders used are a silane-based binder (according to the invention; alkoxysilane, in particular aminoalkoxysilane, preferably based on a commercially available mixture of aminoalkylmethoxysilane, N,N-bis(3-(trimethylsiloxy)propyl)-1,2-ethanediamine and N,N'-bis(3-(trimethylsiloxy)propyl)-1,2-ethanediamine, e.g. Xiameter® from Dow Corning), a siloxane-based binder (according to the invention; polysiloxane, in particular based on a commercially available polyester-modified polysiloxane or aminoalkyl-functionalized polydimethylsiloxane, e.g. Tegomer® from Evonik Industries AG), and a silane- and siloxane-based binder (according to the invention; mixture of abovementioned alkoxysilane and abovementioned polysiloxane), partly together or in admixture with a wax-based bonding agent, and also binders based on polymeric organic resins (not according to the invention; epoxy resin, polyurethane resin, polyacrylate resin).

Granules having the following specification as per Table 3 below are obtained in each case.

TABLE 3

Properties of the carbon fibre-containing granules

| | |
|---|---|
| Diameter of granules | 1-8 mm |
| Average fibre diameter of the carbon fibres | 7-8 μm |
| Average fibre length of the carbon fibres | 80-120 μm |
| Bulk density of the granules | 200-250 g/l |
| Amount of binder in the granules | approx. 6% by weight | c) Overview of the Pellets and Granules Produced

The pellets and granules produced by the above-described processes are summarized in Table 4 below.

TABLE 4

Pellets and granules produced

| Number | Form | Carbon fibres | Binder |
|---|---|---|---|
| a1* | Pellets | Primary fibres | Silane-based binder |
| a2* | Pellets | Recycled fibres | Silane-based binder |
| a2.1* | Pellets | Primary fibres | Siloxane-based binder |
| a2.2* | Pellets | Recycled fibres | Siloxane-based binder |
| a2.3* | Pellets | Primary fibres | Silane- and siloxane-based binder |
| a2.4* | Pellets | Recycled fibres | Silane- and siloxane-based binder |
| a2.5* | Pellets | Recycled fibres | Silane- and siloxane-based binder with 10% bonding agent (wax) |
| a3 | Pellets | Recycled fibres | Epoxy resin |
| a4 | Pellets | Recycled fibres | Polyurethane resin |
| a5 | Pellets | Recycled fibres | Polyacrylate resin |
| b1* | Granules | Primary fibres | Silane-based binder |
| b2* | Granules | Recycled fibres | Silane-based binder |
| b2.1* | Granules | Primary fibres | Siloxane-based binder |

TABLE 4-continued

Pellets and granules produced

| Number | Form | Carbon fibres | Binder |
|---|---|---|---|
| b2.2* | Granules | Recycled fibres | Siloxane-based binder |
| b2.3* | Granules | Primary fibres | Silane- and siloxane-based binder |
| b2.4* | Granules | Recycled fibres | Silane- and siloxane-based binder |
| b2.5* | Granules | Recycled fibres | Silane- and siloxane-based binder with 10% bonding agent (wax) |
| b3 | Granules | Recycled fibres | Epoxy resin |
| b4 | Granules | Recycled fibres | Polyurethane resin |
| b5 | Granules | Recycled fibres | Polyacrylate resin |

*According to the invention

2. Incorporation of the Carbon Fibre-Containing Pellets and Granules into Plastics (Compounding)

The incorporability and the influence of the granules and pellets on composites (compounds) is examined using polycarbonate (PC) as polymer matrix. However, the previously produced granules and pellets can also be incorporated into other thermoplastic and thermoset polymers, e.g. polyether ether ketones (PEEK), polytetrafluoroethylenes (PTFE), polyurethanes (PUR), methacrylate resins (MMA), etc.

10% by weight in each case, based on the amount of polycarbonate (PC) used, of the above-specified carbon fibre-containing pellets or granules are homogeneously incorporated into the polycarbonate (PC) in a screw compounder which is customary for this purpose and is known per se to those skilled in the art so as to give a fibre-containing composite (compound). For comparison, the comminuted carbon fibres used for producing the pellets and granules are likewise incorporated. The melt volume rate (MVR) is determined in accordance with ISO 1133 for each composite obtained in this way.

The results obtained are summarized in Table 5, in each case reporting the change in the MVR in percent relative to the initial MVR of the pure polycarbonate (PC) used without fibres:

TABLE 5

Influence of melt volume rate (MVR) for composites

| Number | Form | Carbon fibres | Influence of MVR [$cm^3$/10 min] in % |
|---|---|---|---|
|  |  | Recycled fibres (chopped)** | −41% |
|  |  | Recycled fibres (chopped and milled)** | −40% |
|  |  | Primary fibres (chopped)** | −49% |
|  |  | Primary fibres (chopped and milled)** | −46% |
| a1* | Pellets | Primary fibres (chopped) | −4% |
| a2* | Pellets | Recycled fibres (chopped) | −2% |
| a2.1* | Pellets | Primary fibres (chopped) | −8% |
| a2.2* | Pellets | Recycled fibres (chopped) | −6% |
| a2.3* | Pellets | Primary fibres (chopped) | −4% |
| a2.4* | Pellets | Recycled fibres (chopped) | −2% |
| a2.5% | Pellets | Recycled fibres (chopped) | −1% |
| a3 | Pellets | Recycled fibres (chopped) | −30% |
| a4 | Pellets | Recycled fibres (chopped) | −27% |
| a5 | Pellets | Recycled fibres (chopped) | −20% |
| b1* | Granules | Primary fibres (chopped and milled) | −3% |
| b2* | Granules | Recycled fibres (chopped and milled) | −1% |
| b2.1* | Granules | Primary fibres (chopped and milled) | −9% |
| b2.2* | Granules | Recycled fibres (chopped and milled) | −6% |
| b2.3* | Granules | Primary fibres (chopped and milled) | −5% |
| b2.4* | Granules | Recycled fibres (chopped and milled) | −3% |
| b2.5% | Granules | Recycled fibres (chopped and milled) | −2% |
| b3 | Granules | Recycled fibres (chopped and milled) | −29% |
| b4 | Granules | Recycled fibres (chopped and milled) | −25% |
| b5 | Granules | Recycled fibres (chopped and milled) | −20% |

*According to the invention
**Without binder

It was surprisingly found that the rheological properties, in particular the flow properties of the polycarbonate (PC), remain at least essentially uninfluenced by the incorporation of the carbon fibre-containing pellets and granules according to the invention, while the incorporation of chopped or milled carbon fibres (i.e. not in the form of pellets or granules) significantly reduces the flow rate of the polycarbonate. A significant decrease in the flow rate of polycarbonate (PC) was likewise obtained when epoxy resin, polyurethane resin and polyacrylate resin are used as binders (not according to the invention). However, a significant decrease in the flow rate of the composite (compound) makes its further processing more difficult, in particular in injection-moulding processes or the like.

Furthermore, the pellets and granules derived from recycled carbon fibres have a lesser influence on the flow rate of the polycarbonate (PC) compared to pellets and granules derived from primary fibres. Without being restricted to a particular theory, the better wettability can be attributed to the hydrophilic or water-absorbing surface properties and to the rougher surface structure of the carbon fibres obtained by recycling.

The use of an additional wax-based bonding agent in the binder does not have a negative influence in relation to the processing behaviour of the pellets or granules according to the invention but, what is more, also improves the throughput rate in the production of the pellets and granules according to the invention (in each case approx. 35% time saving in the production).

The use of a silane- and/or siloxane-based binder in the context of the present invention thus ensures sufficient crosslinking of the carbon fibres to form pellets or granules which not only display good handlability and meterability but also allow homogeneous incorporation into the polymer matrix. In addition, a significant reduction in the flow rate of the polymer matrix, which makes further processing more difficult, is avoided when the carbon fibre-containing granules or pellets of the invention are incorporated.

While Applicant's invention has been described in detail above with reference to specific embodiments, it will be understood that modifications and alterations in embodiments disclosed may be made by those practiced in the art without departing from the spirit and scope of the invention. All such modifications and alterations are intended to be covered.

The invention claimed is:

1. Carbon fibre-containing particles in the form of granules or pellets,
    wherein the carbon fibre-containing particles comprise:
        carbon fibres in comminuted form and
        at least one binder selected from the group consisting of silane-based binders and siloxane-based binders as well as mixtures thereof; and
    wherein the carbon fibres are present as recycled carbon fibres, wherein the recycled carbon fibres have been obtained from carbon fibre-reinforced plastics by means of pyrolytic decomposition thereof.

2. Carbon fibre-containing particles according to claim 1, wherein the carbon fibre-containing particles are in the form of a free-flowing material.

3. Carbon fibre-containing particles according to claim 1, wherein the carbon fibre-containing particles have a bulk density in the range from 150 to 750 g/l.

4. Carbon fibre-containing particles according to claim 1, wherein the carbon fibres have an average fibre length in the range from 0.1 to 5000 μm.

5. Carbon fibre-containing particles according to claim 1, wherein the carbon fibres have an average fibre diameter in the range from 0.1 to 100 μm.

6. Carbon fibre-containing particles according to claim 1, wherein the carbon fibre-containing particles comprise the silane-based or siloxane-based binder in an amount of from 0.1 to 40% by weight, based on the carbon fibre-containing particles.

7. Carbon fibre-containing particles according to claim 1, the carbon fibre-containing particles comprise carbon fibres in an amount of from 60 to 99.9% by weight, based on the carbon fibre-containing particles.

8. Carbon fibre-containing particles according to claim 1, wherein the carbon fibre-containing particles comprise a plurality of carbon fibres in the range from 10 to 1,000,000 carbon fibres per particle.

9. Carbon fibre-containing particles according to claim 1, wherein the silane-based or siloxane-based binder comprises at least one silane or at least one siloxane or consists thereof.

10. Carbon fibre-containing particles according to claim 1, wherein the silane-based or siloxane-based binder comprises at least one organosilane or organosiloxane selected from the group consisting of monomeric organosilanes, oligomeric organosilanes, polymeric organosilanes, organosiloxane, monomeric organosiloxanes, oligomeric organosiloxanes and polymeric organosiloxanes as well as mixtures thereof.

11. Carbon fibre-containing particles according to claim 1, wherein the silane-based or siloxane-based binder comprises at least one (organo)siloxane, poly(organo)siloxane, (organo)siloxane or poly(organo)siloxane, which comprises at least one polar or hydrophilic group selected from among amino groups, alkoxy groups, aryloxy groups, aralkyloxy groups, hydroxyl groups, thiol groups, halogens, carboxylic acid groups, carboxylic ester groups and ammonium groups.

12. Carbon fibre-containing particles according to claim 1, wherein the silane-based or siloxane-based binder additionally comprises at least one bonding agent selected from the group consisting of resins and waxes in amounts in the range from 0.01 to 80% by weight, based on the silane-based or siloxane-based binder.

13. Carbon fibre-containing particles according to claim 1, wherein the carbon fibre-containing particles are in the form of granules.

14. Carbon fibre-containing particles according to claim 13, wherein the granules have a diameter in the range from 0.1 to 40 mm and a bulk density in the range from 1 to 800 g/l.

15. Carbon fibre-containing particles according to claim 1, wherein the carbon fibre-containing particles are in the form of pellets having an at least essentially cylindrical shape.

16. Carbon fibre-containing particles according to claim 15, wherein the pellets have a diameter in the range from 0.5 to 50 mm and a length in the range from 0.5 to 50 mm and wherein the pellets have a bulk density in the range from 1 to 1000 g/l.

17. A process for producing carbon fibre-containing particles in the form of granules or pellets according to claim 1, wherein the process comprises the following steps:
    recycled carbon fibres in comminuted form, which have been obtained from carbon fibre-reinforced plastics by means of pyrolytic decomposition thereof, are firstly brought into contact with at least one binder, which binder is selected from the group consisting of silane-based binders and siloxane-based binders as well as mixtures thereof, and are subsequently shaped to form discrete particles in the form of granules or pellets.

18. A method for producing carbon fibre-containing materials,
    wherein the method comprises the following steps:
    carbon fibre-containing particles in the form of granules or pellets are, as additives, incorporated into or compounded with materials selected from the group consisting of plastics, building materials and cement-based systems,
    wherein the carbon fibre-containing particles comprise:
        carbon fibres in comminuted form and
        at least one binder selected from the group consisting of silane-based binders and siloxane-based binders as well as mixtures thereof; and
    wherein the carbon fibres are present as recycled carbon fibres, wherein the recycled carbon fibres have been obtained from carbon fibre-reinforced plastics by means of pyrolytic decomposition thereof.

* * * * *